Dec. 7, 1943.  E. E. HALL  2,336,094
NUT LOCK
Filed June 15, 1940
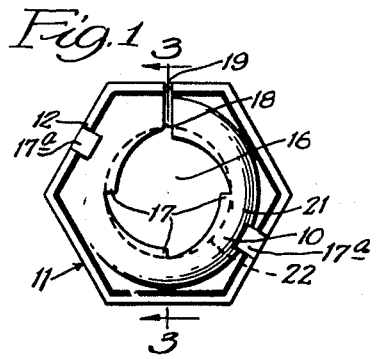
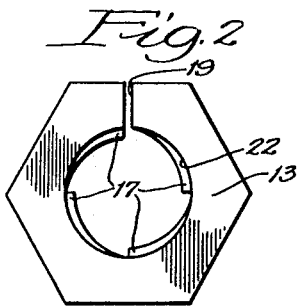
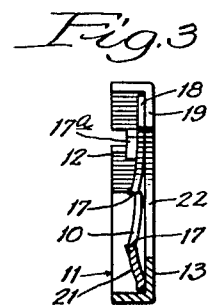
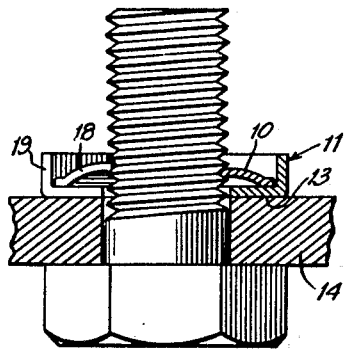
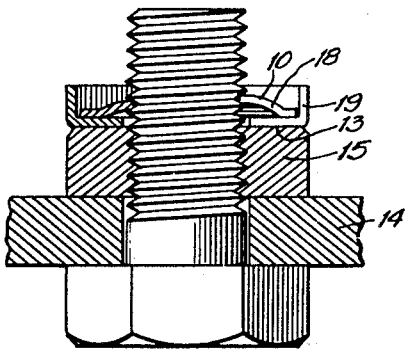
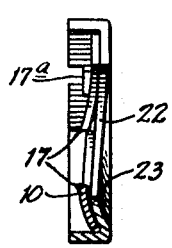
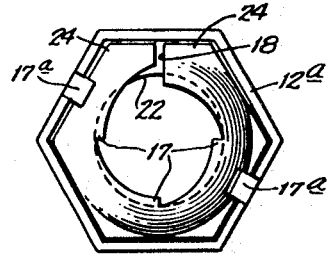
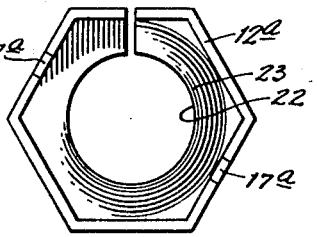
Inventor
Eric E. Hall,
By Banning & Banning
Attorneys.

Patented Dec. 7, 1943

2,336,094

UNITED STATES PATENT OFFICE 2,336,094

NUT LOCK

Eric E. Hall, Chicago, Ill.; Ruth E. Hall, administratrix of said Eric E. Hall, deceased Application June 15, 1940, Serial No. 340,718

2 Claims. (Cl. 151—30)

The nut lock of the present invention, in its general principle of operation, is similar to the nut lock described and claimed in my U. S. Patent No. 2,207,121, of July 9, 1940.

The present invention, however, is designed to permit the active member of the nut lock which engages the threads of a bolt to be made of relatively thin material and employed as an insert within a surrounding shell which serves to reinforce the insert and also to afford the angularly disposed surfaces with which a wrench may be engaged, so that the shell may be used with inserts of varying internal diameter or of varying character to accommodate the device to bolts of different sizes or different thread pitch.

Further objects and details will appear from the description of the invention in conjunction with the accompanying drawing, wherein—

Figure 1 is an inner face view showing the insert in place within the surrounding shell;

Fig. 2 is an outer face view of the same;

Fig. 3 is an sectional view taken on line 3—3 of Fig. 1;

Fig. 4 is a view showing the shell and insert in section and illustrating the device employed as a nut;

Fig. 5 is a similar view showing the employment of the device as a washer;

Fig. 6 is a sectional view showing a modified form of shell having a reinforcing inner flange with the insert in position;

Fig. 7 is a view of the inner face of the shell.

Fig. 8 is a modified form of shell and insert; and

Fig. 9 is an edge view of the insert of Fig. 1.

As shown, the insert 10 is of hexagonal configuration to fit snugly within a hexagonal shell 11 having a marginal flange 12 and a flat contacting face 13 adapted to abut directly against a plate 14 or the like as shown in Fig. 4 or a nut 15 as shown in Fig. 5.

The insert is formed of relatively thin plate material provided with a center bore 16 which is formed by cutting away the metal to provide a plurality of spaced inwardly extending teeth 17, the tips of which are formed to project inwardly to a degree slightly in excess of the thread grooves of the bolt to which the insert is to be fitted, so that in screwing the insert into place it will be sprung or spread slightly in a radial direction, which is permitted by the provision of a slot 18 extending completely through the body of the insert in register with a continuous slot 19 formed through the body and flange of the shell.

Since it is preferred to have the insert fit snugly within the shell, the provision of the registering slots permits the insert and shell to be spread or expanded in unison as the tips of the teeth 17 engage with the side walls of the thread grooves on the bolt. The inserts may be held in place by tongues 17ª struck down from the flange 12.

In order to permit the recurrent engagement of the spaced teeth 17 with the spirally extending thread of a bolt, the body of the insert is formed to afford a flat marginal rim portion 20 from which springs a boss 21 which progressively increases in height in a helical direction to bring the tips of the teeth to the proper elevation to engage the spirally extending thread of the bolt. This arrangement affords a flat base for the insert to fit snugly against the base of the shell and at the same time enables the respective teeth to stand at the proper elevation to engage the bolt thread. It is preferred to have the extreme tips of the teeth displaced slightly beyond the normal helically disposed surface of the boss, so that the teeth will project in an axial direction to a greater degree than the normal pitch of the thread which brings the tips of the teeth into lateral biting engagement with the face of the thread wall and not merely into frictional engagement with the base of the thread groove.

The teeth all project in the same direction and are formed to afford an easy approach to the tip and an abrupt descent therefrom, which permits the device to be easily screwed down to position by the application of power in the proper direction, which will normally result in a slight spreading of the insert and the surrounding shell, so that the tips of the teeth will firmly abut against the side walls of the bolt thread and resist any unscrewing of the device in the opposite direction. In fact, in order to remove the device, it will ordinarily be necessary to drive a wedge into the slit or gap, since the unscrewing of the device otherwise could only be effected by scoring the threads of the bolt.

The shell is provided with an aperture 22 which is sufficiently large in diameter to clear the bolt threads so that the actual gripping is afforded entirely by the teeth of the insert, which, however, are rigidly reinforced by the surrounding shell.

Fig. 6 shows a modification in which a helical boss 23 surrounds the aperture 22 in the shell, the boss being so disposed as to bring its upper face into contact with the under face of the boss 21 on the insert, the surface of the boss following the helical formation of the insert. This arrangement is of peculiar advantage in that it affords an additional reinforcement for the insert around a line closely adjacent to the bases of the teeth, thereby enabling the insert to be made of very thin metal without danger of distortion of the teeth when subjected to stress.

In Fig. 8 I have shown a modification in which no slit or gap is provided in the shell flange 12ª which extends continuously around the margin of the shell, and in order to provide for the spreading of the insert the margins of the insert at the points 24 adjacent the slot 18 are slightly cut away or reduced so that a clearance is afforded at these points between the edges of the insert and the surrounding shell flange.

Further modifications in detail may be made in the formation, arrangement, or number of the teeth, without departing from the principles of the invention. Although I prefer to employ teeth having tips which are slightly offset to impinge firmly against the side walls of the bolt threads, this is a detail of construction which may be omitted in cases where an extremely firm grip is not required, since the tip edges of the teeth, even if not displaced or offset laterally, as shown, will bite against the side faces of the bolt threads.

The arrangement is one which permits the inserts to be stamped from relatively thin material while the shell is of a sufficiently rigid and rugged character to afford abundant reinforcement and at the same time to provide sufficient lateral exterior surface to enable a wrench or the like to secure a firm grip against the angularly disposed faces of the shell.

Furthermore, by the employment of a shell of this character, a continuous base surface will be afforded for contact with a plate or nut as the case may be, while at the same time the insert may be offset or distorted from a plane surface in order to afford the helical line of progression required to locate the teeth in a helical line in register with the bolt thread. Also, by forming the insert separately from the shell, it is possible to make each of these parts of the device from metal which is best adapted to meet functional requirements.

I claim:

1. A nut lock or the like comprising an insert member formed of relatively thin plate metal having a centrally disposed boss springing upwardly in circumferentially progressively increasing elevation from a flat marginal rim, the boss being provided with a central aperture having inwardly projecting teeth positioned in a helix to engage the threads of a bolt, the insert member being split across one side of its body to permit expansion thereof, and a separately formed apertured shell member having a floor continuously abutting the flat marginal rim of the insert and having a flat-sided marginal flange adapted to be engaged by a wrench or the like surrounding the exterior edge of the insert member, said shell having an outer base, the margins of which are adapted to abut flatwise against a nut or the like, the shell having a central aperture of diameter sufficiently great to permit protrusion of the insert teeth inwardly beyond the edge of the aperture.

2. A nut lock or the like comprising an insert member formed of relatively thin plate metal having a centrally disposed boss springing upwardly in circumferentially progressively increasing elevation from a flat marginal rim, the boss being provided with a central aperture having inwardly projecting teeth positioned in a helix to engage the threads of a bolt, the insert member being split across one side of its body to permit expansion thereof, and a separately formed apertured shell member having a floor configured to abut the flat marginal rim of the insert and having a flat-sided marginal flange adapted to be engaged by a wrencch or the like and surrounding the exterior edge of the insert member, said shell having an outer base, the margins of which are adapted to abut flatwise against a nut or the like, the shell having a central aperture of diameter sufficiently great to permit protrusion of the insert teeth inwardly beyond the edge of the aperture, and having around the shell aperture a helically edged inner boss adapted to underlie the insert adjacent the teeth to reinforce the same.

ERIC E. HALL.